(No Model.) 2 Sheets—Sheet 2.
R. G. GUPTILL.
GLASS PIPE CASTING MACHINE.
No. 494,951. Patented Apr. 4, 1893.
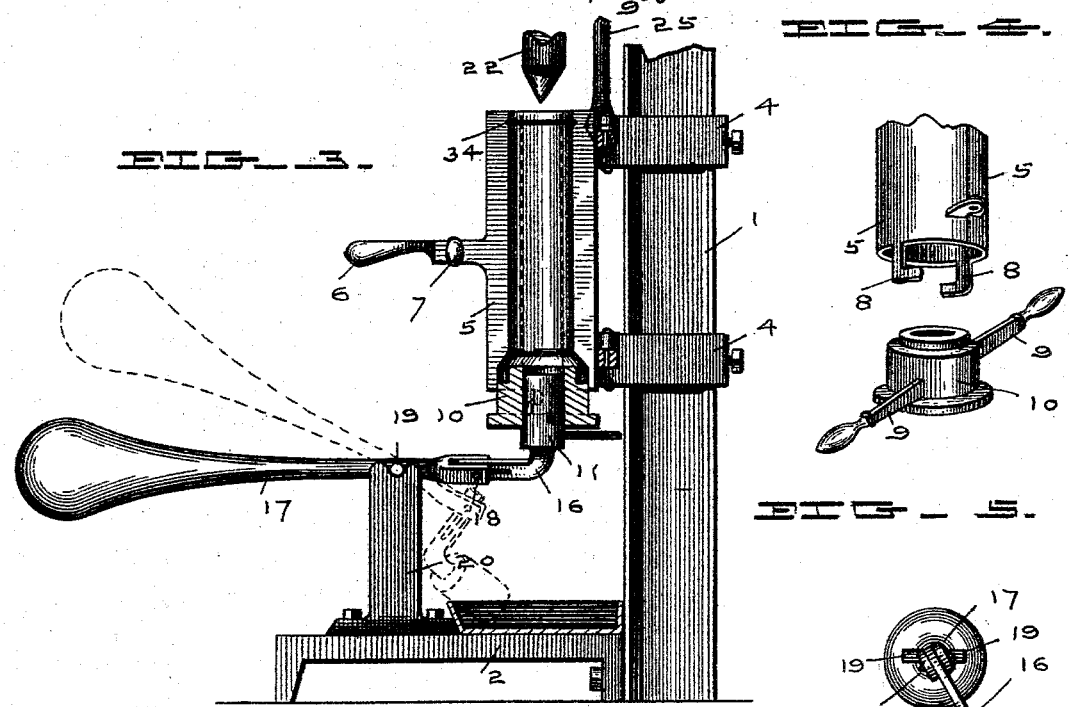
Witnesses
H. D. Nealy
C. D. Griffith
Inventor
Roderick G. Guptill
By his Attorney
V. H. Lockwood

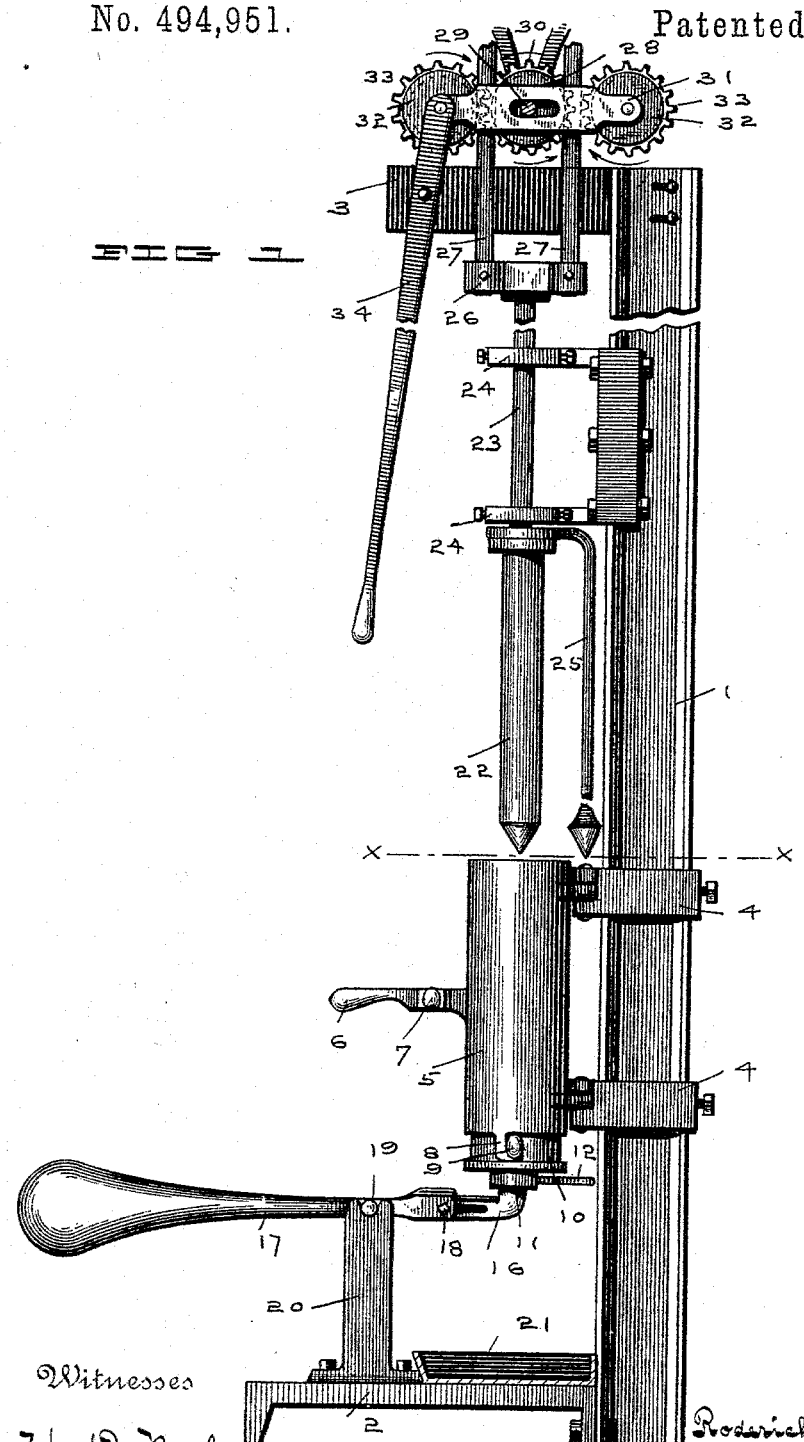

UNITED STATES PATENT OFFICE.

RODERICK G. GUPTILL, OF PENDLETON, INDIANA.

GLASS-PIPE-CASTING MACHINE.

SPECIFICATION forming part of Letters Patent No. 494,951, dated April 4, 1893.

Application filed May 23, 1892. Serial No. 433,975. (No model.)

*To all whom it may concern:*

Be it known that I, RODERICK G. GUPTILL, of Pendleton, county of Madison, and State of Indiana, have invented certain new and useful Improvements in Glass-Pipe-Casting Machines; and I do hereby declare that the following is a full, clear, and exact description thereof, reference being had to the accompanying drawings, in which like figures refer to like parts.

My invention relates to the construction of machines for molding glass pipes and tubes, and more especially to that class known as hand machines, and is an improvement on the one described and claimed in the patent issued to me on the 21st day of October, 1890, No. 438,807, and will be understood from the following description.

In the drawings, Figure 1 is a side elevation of my improved machine, the water pan at the base being in section. Fig. 2 is a cross sectional view on the line $x-x$, Fig. 1, the mold and its connections being in plan. Fig. 3 is a view partly in elevation and partly in section, showing one half of the mold removed. Fig. 4 is a detail perspective view of the lower end of the mold and the flange forming collar which fits within the same. Fig. 5 is a detail end view of the plug which closes the open end of the flange forming collar, and its operating lever, the plug being thrown out of place on an angle. Fig. 6 is a sectional view through the plug on the line $y-y$, Fig. 7, showing the spring arms for holding it in place within the collar. Fig. 7 is a cross sectional view through the same on the line $z-z$, Fig. 6.

In detail, 1 represents the main frame of the machine rigidly secured to the base plate 2, 3 being an extended arm or bracket adjustably secured to the top of the main frame.

4 are sliding blocks or brackets adjustably secured to the main frame by bolts, and to these the two sections of the divided mold 5 are hinged, 6 being the handles of the same, and 7 a bar for locking them together when the mold is closed. The inside of the mold is flared out at the bottom, as shown in Fig. 3, to partly form the flange on the pipe that is to be cast, and 8 are lugs or hooks, one on each half of the mold, for engagement with the arms 9 formed on the opposite sides of the hollow collar 10 which is adapted to fit up in the end of the mold, and by which the inner part of the flange on the pipe is formed.

11 is a plug adapted to fit within the collar 10 when it is in place, and is retained in position by means of the projecting spring arms 12, which are pivoted within the block at 13, as shown in Fig. 7, the outer ends of the arms being so bent outside of the plug as to form a circular opening 14 when the ends of the two arms are together, they being held in this position by a coiled spring 15.

16 represents a bent arm formed on the lower end of the plug 11, and having a slot in its opposite end which is secured in the slotted end of the weighted lever 17 and retained in place by a pin 18, the weighted lever 17 having lugs or projections 19 on either side which rest in a double bracket 20 adjustably secured by bolts to the base 2 of the machine, 21 being a shallow pan also resting on the base 2, and into which any molten glass that may escape from the mold drops.

22 is a core having a tapering or conical head, and is supported above and in a central line with the mold by the piston or plunger 23, to which it is connected, this plunger having bearings in adjustable slides 24 secured to the main frame 1.

25 is a vertical arm also secured to the plunger 22, and has a conical head in a vertical line with the circular opening 14 formed by the extensions of the spring arms 12 of the plug 11 when in place at the bottom of the mold. The plunger 23 is secured at a suitable height to the cross head 26, to which is also connected the two vertical operating arms or bars 27, these normally being placed in the position shown in Fig. 1 on either side of the face of the driving pulley 28 mounted on the stationary drive shaft 29 from which power is applied, 30 being a gear wheel also mounted on the same shaft.

31 is a double bracket centrally slotted and working loosely on the driving shaft 29, and carrying on each of its outer ends the friction pulley 32 and a gear wheel 33 in line with and adapted to contact with the gear wheel and pulley mounted on the driving shaft, 34 being a handle pivoted to the bracket 3 of the main frame, and also to one end of the double bracket 31 for throwing in and out of connection the several pulleys, and thus operating the machine.

Having mentioned the different parts of my machine, I will now describe its operation, which is as follows: The several parts of the mold being in place, as shown in Fig. 3, a sufficient quantity of molten glass is poured therein, and by throwing the operating handle or lever 34 outward in the position shown in Fig. 1, the gear wheel 33 on that end of the bracket will engage with the one on the drive shaft and the two pulleys 28 and 32, contacting frictionally with one of the vertical rods 27, thus force the plunger carrying the core of the mold downward and into such mold through the molten mass of glass therein until the tapering head of the mold has reached a point of contact with the plug 11 which closes the bottom of the collar 10 and the mold, by which time the tapering head on the arm 25 will have reached and entered the opening 14 formed between the two extensions of the spring arms 12 in the closing plug far enough to separate the arms and thereby withdraw the arms 12 within the plug, thus allowing the same by its own weight and through the pressure of the core upon it to be forced out from the collar, and will drop down with its lever into the position shown in the dotted lines in Fig. 3, at which time any surplus glass from the mold will be either dropped through, or will be forced over the top of the mold into the pan 21 formed on the base 2 of the machine. When the core has reached the downward limit of its movement, by moving the operating lever inward, the gear wheel 33 mounted on that end of the bracket 31 will be thrown out of engagement with the one carried on the main driving shaft, and the frictional contact of the two pulleys will be released on the vertical rod 27, and the downward movement of the core will cease. When the glass pipe thus formed has cooled to a sufficient degree, the operating lever 34 is moved farther inward, moving the bracket 31 to the left, and bringing into engagement the gear wheel pivoted in the opposite end of the bracket with the one mounted on the driving shaft, thereby operating the friction pulley 32 and the one on the drive shaft against the vertical rod 27 in the direction of the arrows to the left in Fig. 1, and, through this frictional contact, lifting the rod, together with the plunger, and drawing the core of the pipe which has been cast, after which, by turning the handles of the collar 10 out of engagement with the lugs 8 and supporting the collar, the mold may be opened and the glass pipe or tube which has been cast may be removed and carried away, the tube itself being supported upon the collar 10. Upon closing the mold and inserting the collar 10 and plug 11 in their former places, the operation of pipe casting may then be repeated.

Where glass pipes of different sizes are to be made on the same machine, this can be readily done by changing the size of the core and the mold, for the various parts of the machine being adjustable, the changes necessary to adjust the different parts in a correct line and position can be made, but in such case there would be provided a knuckle joint in the plunger so as to allow for the change in the central line of the mold without changing the position of the framework and its base.

It has heretofore been very difficult to always draw the plunger from the molded pipe at the exact moment that the glass has cooled to the proper temperature, and in some cases the plunger will draw up with it a portion of the pipe and leave the remainder in the mold. To overcome this difficulty, I provide a groove 34 in the inside of the mold just within the top, so that as the glass is poured in the mold, a small bead will be formed around the top of the pipe, and thus prevent any part of the molded pipe from being drawn out with the plunger.

What I claim as my invention, and desire to secure by Letters Patent, is the following:

1. In a glass pipe casting machine, a framework, a mold adjustably supported thereon, a movable core connected with a plunger supported above and in line with the mold, such core adapted to be raised and lowered by means of a friction clutch mechanism supported above the framework, such mold centered and closed at its lower end by a removable pivoted plug, substantially as shown and described.

2. In a glass pipe casting machine, a framework, a fixed sectional mold supported thereon, a removable collar adapted to fit in the lower part of such mold for forming the bell of the pipe, a plug adapted to be retained within such collar by spring arms, a core supported above and in line with the mold, and adapted to be raised and lowered by suitable means, substantially as shown and described.

3. In a glass pipe casting machine, a framework, a fixed mold supported thereon, a removable collar fitting within the mold for forming the bell of the pipe, a plug pivotally mounted on the end of a weighted lever supported from the base of the machine, such plug adapted to fit within the collar and to close the same, and retained therein through suitable spring arms, a core supported above and in line with such mold, mechanism for raising and lowering the same, and means for automatically releasing the plug when the core has reached the bottom of the mold, substantially as shown and described.

4. In a glass pipe casting machine, a framework, a fixed sectional mold supported thereon, a removable collar secured within such mold for forming the bell of the pipe, a plug adapted to fit in such collar and retained therein by spring arms, a core supported above and in line with such mold and adapted to be raised and lowered through suitable mechanism, the plug at the base of the mold adapted to be automatically released when the core has reached the bottom of the mold, substantially as shown and described.

5. In a glass pipe casting machine, a framework, a sectional mold supported thereon, a removable collar adapted to fit in the lower part of the mold for forming the bell of the pipe,—a plug adapted to fit in such collar and be retained therein by spring arms, a core connected to a plunger above and in line with the mold, a vertical arm connected to such plunger and having a conical head adapted to engage with the spring arms of the plug, thereby releasing the same when the core has reached the bottom of the mold, in combination with a mechanism for raising and lowering such core and its plunger, substantially as shown and described.

6. In a glass pipe casting machine, a framework, a fixed sectional mold supported thereon, a removable collar fitting within the lower end of the mold for forming the bell of the pipe, a plug adapted to fit within the collar and having spring arms for locking the plug in place, such arms having extensions with a circular opening formed between them, such plug pivotally supported from a weighted lever mounted on a bracket supported from the base of the machine, a core connected to a plunger supported above and in line with the mold, which also carries a vertical arm having a tapering head for engaging with the spring arms of the plug when the core has reached the bottom of the mold, whereby the plug is released, two rods connected with a cross head formed on the top of the plunger, a friction pulley and gear mounted on a drive shaft between such rods, a friction pulley and a gear carried in a double bracket on each side of such rods, and operated by a lever from below, such gears adapted to engage with the one on the main shaft, such friction pulleys and the one on the main shaft adapted to contact with the vertical rods alternately, whereby the core and its plunger may be raised and lowered, substantially as shown and described.

7. In a glass pipe casting machine, a framework, a sectional mold supported thereon, a core connected with a plunger above and in line with such mold, such plunger working in adjustable slides connected with the main frame, a cross head secured to the top of the plunger and carrying thereon two rods, a gear wheel and pulley mounted on a drive shaft carried above the machine and between the vertical rods of the cross head, a gear wheel and a friction pulley carried in a double bracket on the outside of such rods, such gear wheels in line with and adapted to engage with the gear wheel of the drive shaft, such friction pulleys adapted to engage alternately in connection with the pulley on the drive shaft with one of the vertical rods, whereby the plunger and the core of the mold may be raised and lowered alternately, substantially as shown and described.

8. In a glass pipe casting machine, a framework, a sectional mold hinged to brackets adjustably supported thereon, a removable collar adapted to fit within the lower end of the mold for forming the bell of the pipe, and a plug adapted to close such collar and retained in position by spring arms, such arms centrally pivoted in and extending outside the plug where an opening is formed between them, a core connected with a plunger supported above and in line with the mold, a vertical arm also connected to such plunger, and having a beveled head adapted to engage with the extended arms of the closing plug, and releasing the same when the core has reached the bottom of the mold, in combination with mechanism for operating the plunger and its core, whereby the same are raised and lowered, substantially as shown and described.

In witness whereof I have hereunto set my hand this 16th day of May, 1892.

RODERICK G. GUPTILL.

Witnesses:
H. D. NEALY,
E. B. GRIFFITH.